United States Patent [19]

Gustafsson

[11] Patent Number: 5,580,032
[45] Date of Patent: Dec. 3, 1996

[54] ARRANGEMENT FOR A GAS SPRING

[75] Inventor: Krister Gustafsson, Tranas, Sweden

[73] Assignee: Stromsholmens Mekaniska Verkstad AB, Sweden

[21] Appl. No.: 532,766

[22] PCT Filed: Apr. 15, 1994

[86] PCT No.: PCT/SE94/00332

§ 371 Date: Sep. 26, 1995

§ 102(e) Date: Sep. 26, 1995

[87] PCT Pub. No.: WO94/25775

PCT Pub. Date: Nov. 10, 1994

[30] Foreign Application Priority Data

Apr. 27, 1993 [SE] Sweden ................................. 9301411

[51] Int. Cl.[6] ..................................................... F16F 13/00
[52] U.S. Cl. ...................... 267/64.27; 267/121; 267/135
[58] Field of Search ............................... 267/64.11, 64.19, 267/64.23, 64.27, 119, 121, 130, 139, 152; 188/266, 269; 248/562, 566

[56] References Cited

U.S. PATENT DOCUMENTS

| | | |
|---|---|---|
| 2,282,312 | 5/1942 | Halstead . |
| 2,457,749 | 12/1948 | Thiry ........................... 267/121 |
| 2,973,953 | 3/1961 | Fikse ............................ 267/35 |
| 3,191,964 | 6/1965 | Chambers ................. 267/64.23 |
| 3,743,059 | 7/1973 | Morse et al. ................. 267/152 |
| 4,662,791 | 5/1987 | Spicer ........................ 267/121 |
| 5,277,281 | 1/1994 | Carlson et al. ............ 267/140.14 |

FOREIGN PATENT DOCUMENTS 2027517  8/1979  United Kingdom .
9014528  11/1990  WIPO .

*Primary Examiner*—Robert J. Oberleitner
*Assistant Examiner*—Chris Schwartz
*Attorney, Agent, or Firm*—Merchant, Gould, Smith, Edell, Welter and Schmidt, P.A.

[57] ABSTRACT

The invention relates to an arrangement for a gas spring (1). This consists of an outer cylindrical casing (1a) with a sealing end wall (1b, 1c) at either end. Of these, one (1c) has an axial bore for a piston rod (4a) passing through the bore, which piston rod is connected to a piston (4b) moving axially in the interior of the casing. The arrangement also consists of an annular cylindrical body (5) made of an elastic material. The outer cylindrical wall of the body (5) is operatively connected to the casing (1a) in a sealing fashion. The inner cylindrical wall of the body (5) is operatively connected to the piston (4b) in a sealing fashion. A certain gas pressure prevails in a space (9) defined by the cylindrical wall of the casing (1a), the other end wall (1b) and the piston (4b) and the annular surface of the annular cylindrical body (5) facing away from the end wall (1c) executed with a bore. Metal tubes (6a and 6b) are attached to the cylindrical surfaced of the body (5) in the form of an annular cylinder. These project beyond the body (5) in a direction towards the flange (11) and define an annular cylindrical space with the end wall (1c).

4 Claims, 1 Drawing Sheet

ARRANGEMENT FOR A GAS SPRING

FIELD OF THE INVENTION

The present invention relates to an arrangement for a gas spring consisting of an outer cylindrical casing with a sealing end wall at either end, one of which has an axial bore for a piston rod passing through the bore, which piston rod is connected to a piston moving axially in the interior of the casing, in conjunction with which the arrangement consists of an annular cylindrical body made of an elastic material, the outer cylindrical wall of which is operatively connected to the casing in a sealing fashion, and the inner cylindrical wall of which is operatively connected to the piston in a sealing fashion, in conjunction with which a certain gas pressure prevails in the space defined by one of the cylindrical walls of the casing, the second end wall and the piston and the annular surface of the end wall of the annular cylindrical body facing away from the end wall executed with a bore.

BACKGROUND OF THE INVENTION

Gas springs are now highly familiar constructional elements, which are used successfully in many applications in place of conventional helical springs, for example.

One disadvantage is that a gas spring is only capable of withstanding approx. 4–5 million spring cycles; the gas spring must then be renovated, in conjunction with which the seals, amongst other things, will require replacement.

Previously disclosed through WO 90/14528 is a double gas spring with two pistons capable of moving axially inside a cylinder. In order to avoid leakage between the cylinder and the respective piston, there is present an annular cylindrical body made of an elastic material which is connected to the cylinder and the respective piston in a sealing fashion. The gas spring lacks end walls serving as guides for the piston, and there is thus no risk of increased wear occurring between these and the aforementioned annular cylindrical bodies, which would reduce the service life.

SUMMARY OF THE INVENTION

The object of the present invention is to make available a gas spring of the kind referred to by way of introduction, which is capable of withstanding approximately ten times more spring cycles than previously disclosed gas springs, and at a cycle frequency of up to 70 Hz.

This is achieved in accordance with the invention in that a metal tube is attached to the respective cylindrical surfaces of the annular cylindrical body, which metal tube projects beyond the body in a direction towards the end wall executed with a bore and in so doing defines an annular cylindrical space together with the aforementioned end wall.

As can be appreciated from a particular characteristic of the invention, a static seal acts as a satisfactory possible seal for the aforementioned space between the cylindrical surfaces of the annular cylindrical body and the piston and the inner wall surface of the casing.

As can be appreciated from a further particular characteristic of the invention, the operative connection between the annular cylindrical body and the piston consists of an annular flange arranged thereon, which is so arranged as to be in engagement with the edge surface of the metal tube facing towards the end wall executed with a bore, and the operative connection between the body and the cylindrical wall of the casing is a frictional engagement supported by the aforementioned gas pressure.

In order further to increase the service life, the edge of the annular flange facing towards the annular cylindrical body is rounded.

BRIEF DESCRIPTION OF THE DRAWINGS

The invention is described below in greater detail with reference to the accompanying drawing, which illustrates the arrangement in accordance with the invention schematically as a longitudinal view.

DETAILED DESCRIPTION OF THE PREFERRED EMBODIMENT

Figure 1:
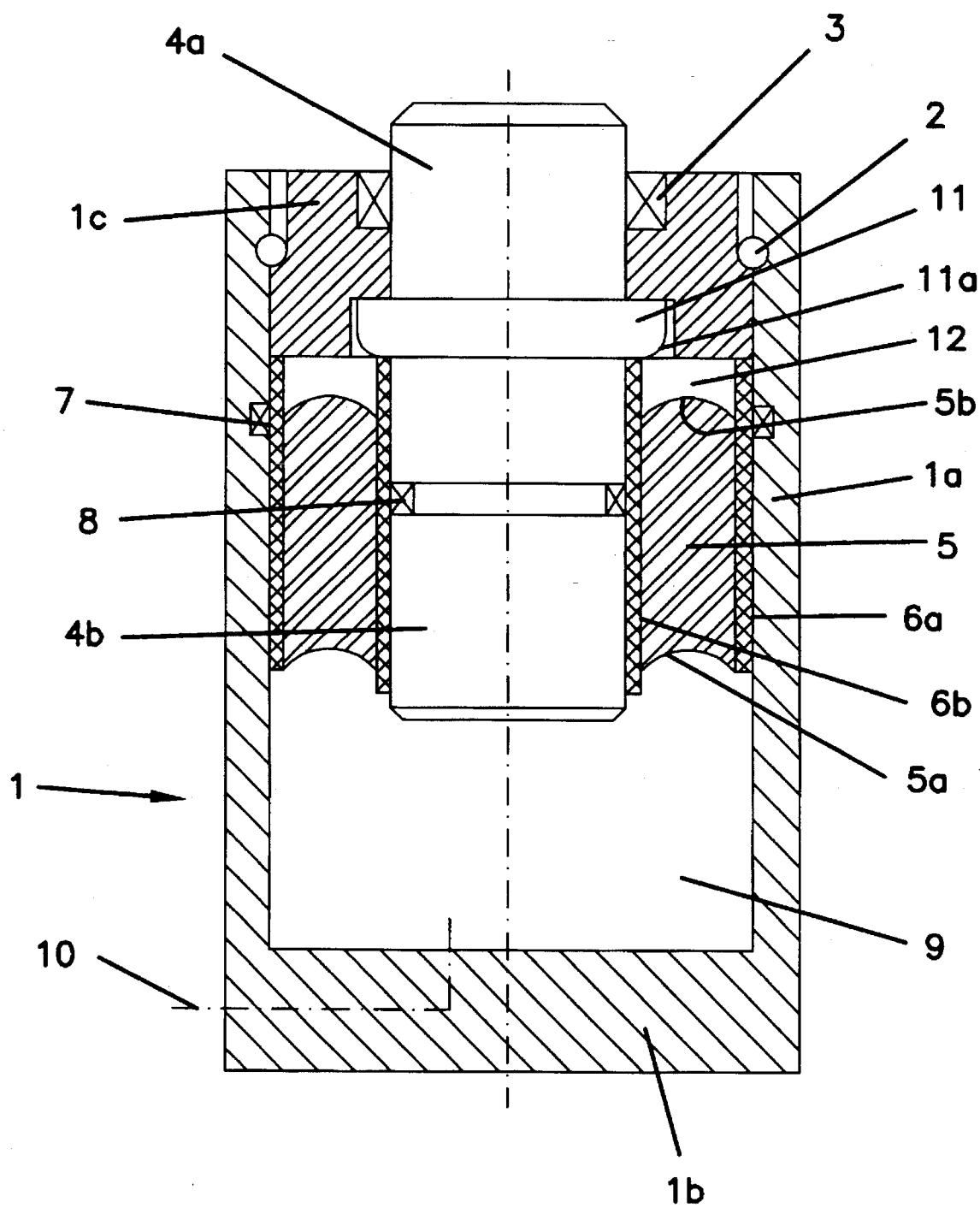

The designation 1 is used generally in the drawing in respect of a gas spring consisting of a cylindrical casing 1a with sealing end walls 1b, 1c. The end wall 1b and the cylindrical casing 1a are preferably manufactured in a single piece.

The end wall 1c, on the other hand, is fixed in the casing 1a in a conventional fashion by means of a locking ring 2 engaging in an annular groove in the inner wall of the casing 1a. The sealing requirement here is not particularly demanding, for which reason no special seal is used here.

Present in the end wall 1c is an axial bore, provided with a scraper ring 3, for a piston rod 4a passing through it which is attached to a piston 4b.

This is capable of axial displacement inside the casing 1a, and in the embodiment shown here forms a unit together with the piston rod 4a.

Present between the piston 4b and the cylinder wall 1a is an annular cylindrical body 5 made of an elastic material, the cylindrical surfaces of which are covered by metal tubes 6a, 6b in the illustrated embodiment. Elastic annular seals 7, 8 provide sealing between the cylinder wall 1a and the tube 6a and between the piston 4b and the tube 6b. A space 9 defined by the cylindrical wall of the casing 1a, the end wall 1b securely attached to the casing 1a and the piston 4b and the surface 5a of the annular cylindrical body 5 facing towards the aforementioned end wall 1b is filled with nitrogen gas at a predetermined pressure. A filling valve with a channel discharging into the space 9 is marked in the drawing with a dotted and dashed line 10. Depression of the piston rod 4a reduces the volume of the space 9 in a previously disclosed fashion and causes the nitrogen gas to be compressed, in conjunction with which the desired springing effect is achieved.

In accordance with the invention the metal tubes 6a, 6b project in a direction towards the end wall 1c executed with a bore beyond the body 5, so that an annular cylindrical space 12 is formed between the tubes 6a, 6b, the end wall 1c and the upper end surface of the body 5. This space serves as an expansion space for the body 5, the upper annular surface 5b of which curves upwards through the effect of the gas pressure inside the space 9, as shown in the drawing. The expansion chamber 12 is of critical significance to the service life of the gas spring. It has been possible to demonstrate through practical tests a more than tenfold increase in the service life of the spring compared with the service life achieved without this space. The background to this is that, when the gas springs are in operation and the piston 4b is forced into the cylinder 1a, the body 5 is forced upwards by the increasing gas pressure inside the space 9. The space 12 permits the body 5 to be forced upwards in this way, but without it coming into contact with the end wall 1c, which would cause mechanical wear and ageing due to friction heat.

In order for the annular seals 7,8 to be capable of acting as static seals, it is essential for there not to be any relative movement between the inner wall of the casing 1a and the tube 6a on the one hand, and between the piston 4b and the tube 6b on the other hand. This means that the body 5 performs the function of a dynamic seal. Operative connections are provided for this purpose between the casing 1a and the piston 4b or the piston rod 4a and the annular cylindrical body 5. These operative connections in the former case consist of a frictional engagement between the inner wall of the casing 1a and the outer wall of the tube 6a supported by the gas pressure inside the space 9, and in the latter case consist of an annular flange 11 arranged on the piston rod 4a, which flange is so arranged as to be in engagement with the tube 6b. The edge 11a of the annular flange 11 facing towards the body 5 is rounded in accordance with the invention so as to reduce wear through contact with the body 5.

I claim:

1. An arrangement for a gas spring comprising:

an outer cylindrical casing including first and second sealing end walls at opposite ends, the first end wall including an axial bore;

a piston moving axially within the casing, the piston including a piston rod passing through the axial bore;

a cylindrical body made of an elastic material and including inner and outer cylindrical walls, the outer wall being operatively connected to the casing in a sealing fashion, and the inner wall being operatively connected to the piston in a sealing fashion to provide a certain gas pressure in a space defined by the cylindrical casing, the second end wall, the piston, and the body; and a metal tube attached to each of the inner and outer cylindrical walls of the body and projecting beyond the body in a direction toward the first end wall to define an annular cylindrical space with the first end wall.

2. The arrangement in accordance with claim 1, wherein a static seal acts between the inner cylindrical wall of the annular cylindrical body and the piston and between the outer cylindrical wall of the body and an inner wall surface of the casing.

3. The arrangement in accordance with claim 1, wherein the operative connection between the inner wall of the annular cylindrical body and the piston includes an annular flange arranged thereon, the flange being arranged as to be in engagement with an edge surface of the metal tube facing towards the first end wall, and in that the operative connection between the outer wall of the body and the casing is a frictional engagement supported by the gas pressure.

4. The arrangement in accordance with claim 3, wherein an edge of the annular flange facing towards the annular cylindrical body is rounded.

* * * * *